Feb. 10, 1942.   G. P. BOSOMWORTH   2,272,890
CONDUIT COUPLING
Filed May 2, 1939

INVENTOR
George P. Bosomworth
BY
ATTORNEYS

Patented Feb. 10, 1942

2,272,890

UNITED STATES PATENT OFFICE 2,272,890

CONDUIT COUPLING

George P. Bosomworth, Akron, Ohio, assignor to The Firestone Tire & Rubber Company, Akron, Ohio, a corporation of Ohio Application May 2, 1939, Serial No. 271,290

1 Claim. (Cl. 285—143)

This invention relates to conduit couplings for connecting the ends of conduits that convey fluid under pressure, and more especially it relates to conduit couplings that employ the pressure of the fluid for effecting the coupling operation and for maintaining a tight seal thereat.

The invention is of primary utility for use in apparatus for vulcanizing pneumatic tire casings. Vulcanization of pneumatic tires is effected by confining the tires in heated molds, and distending the tires against the mold walls by means of heated fluid under pressure, the fluid being admitted to an expansible core mounted within the tire. Said expansible cores are provided with tubular inflation stems, and the latter require to be connected to a source of fluid pressure when a tire is mounted in a mold, and disconnected therefrom as the tire is removed from the mold, after vulcanization has been effected.

The chief objects of the invention are to provide an improved conduit coupling for connecting a supply pipe of fluid under pressure to the inflation stem of an expansible core in tire vulcanizing apparatus; and to provide a coupling of the character mentioned wherein the pressure of the fluid is utilized for effecting the coupling operation, automatically as pressure fluid is discharged from the supply pipe. Additional objects include the elimination of manual operations in the operation of the coupling; and the saving in expense effected thereby. Other objects will be manifest as the description proceeds.

Figure 1:
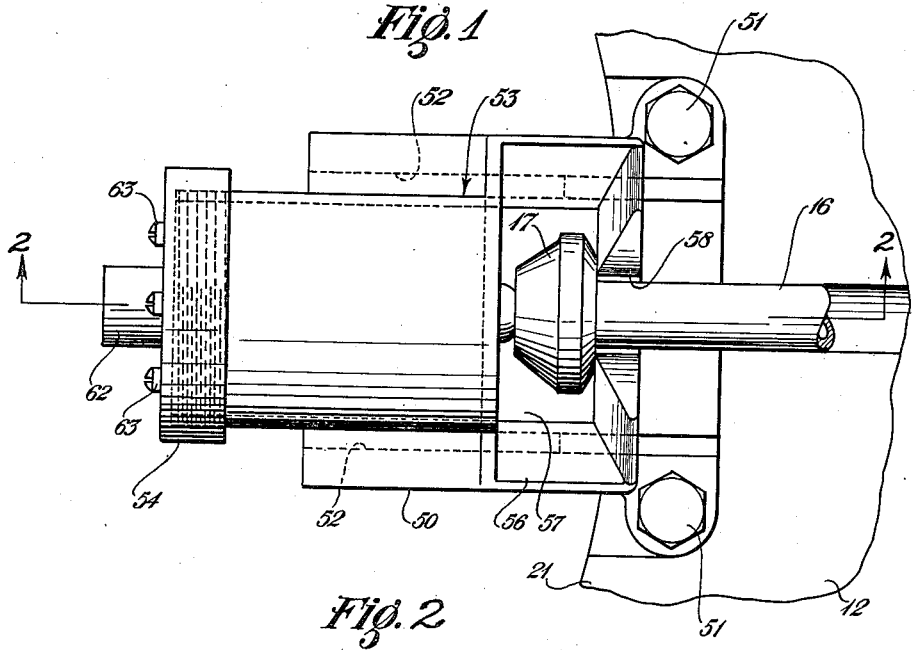
Figure 1 is a plan view of a conduit coupling embodying the invention.

Referring to the drawing, there is shown a portion of the lower mold section 10 of an annular steam-jacket tire-vulcanizing mold of conventional or preferred construction, said lower mold section having the usual bead ring 12 seated therein. In practice, the lower mold section 10 usually is stationarily mounted, the upper mold section (not shown) constituting a cover or lid that is movable relatively of the lower mold section to open and close the mold. The bead ring 12 is movable axially of the lower mold section to strip a finished tire therefrom, and to receive an unvulcanized tire, the lowering of the bead ring serving to lower the unvulcanized tire into the lower mold section during the loading of the mold. The mold is formed with the usual annular tire-molding cavity interiorly thereof, within which cavity a pneumatic tire casing (not shown) may be confined. For the vulcanizing of the tire casing, a hollow expansible core (not shown) usually is mounted in the tire and distended, during the vulcanizing operation, by heated fluid under pressure for the purpose of forcing the tire structure into conformity with the shape of the molding cavity, and for transferring heat to the interior of the tire casing. The heated fluid may be steam, hot air, or any other fluid customarily employed for the purpose. The expansible core is provided at its inner circumference with a tubular metal inflating stem 16 that extends radially through the mold structure at the inner circumference thereof, the bead ring 12 and the upper mold section (not shown) being suitably recessed to receive said inflating stem. The inflating stem 16 of the expansible core of a tire is provided on its outer end, exteriorly of the mold structure, with an annular terminal knob or adapter 17 that has a tapered, frusto-conical nose on its exterior, and is formed interiorly with a flared axial aperture or orifice 18 that is contiguous with the bore of inflating stem 16.

The other member of the improved coupling comprises a base plate 50 that is mounted upon a lifting flange 21 formed on the inner circumference of the lower mold section 10, said base plate being secured to the flange at one end only, by means of cap screws 51, and extending radially inwardly therefrom. Formed on the top side of base plate 50, at opposite lateral margins thereof, are undercut slideways 52, 52, and slidably mounted therein is a housing structure 53 that is of general tubular form, and has an annular cap 54 threaded onto the rear end thereof. The forward end of the housing 53 has an axially apertured wall 55, and forwardly of said wall the housing is integrally formed with a head structure 56. The head 56 includes an upwardly open recess 57 for receiving the adapter 17, the forward wall of the head being cut away from the top thereof, as shown at 58, to provide for the entrance of the inflating stem 16 on which said adapter is mounted.

Mounted within the housing 53 is a structure that is expansible by means of fluid pressure, and by reason of said expansion effects fluid-tight connection with said adapter 17. Said structure comprises a metal bellows 60 that is disposed co-axially of the housing 53, the rear end of said bellows being secured by welding or soldering to the periphery of a circular flange 61 formed on a tubular inlet pipe 62 intermediate the ends of the latter. The pipe 62 is secured to the annular cap 54 by means of screws 63 that are threaded into its flange 61, the portion of said pipe that is disposed rearwardly of the flange extending through the axial opening of the cap 54. The bore of the pipe 62 is threaded at the rear end thereof to receive a suitable nipple (not shown) by which the pipe is connected to a conduit that delivers fluid pressure to the connector. The pipe 62 extends well into the bellows 60, and adjacent its forward end is formed with a plurality of ports 64, 64 extending radially outwardly from its axial passage.

Figure 2:
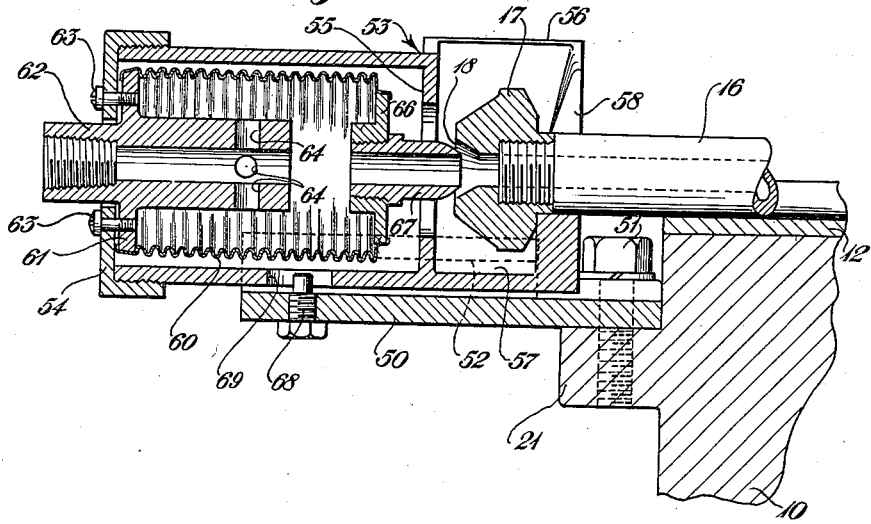
Figure 2 is a section on the line 2—2 of Figure 1.

At its forward end the bellows 60 carries an end cap 66 that is formed with a threaded axial aperture in which is mounted a tubular nose 67 that extends through the aperture in wall 55, the forward end of said nose being beveled or rounded. The position of the nose 67 is such that it is in axial alignment with the adapter 17 of a valve stem 16 of an expansible core in a tire in the mold, said nose normally projecting somewhat into the flared orifice 18 of said adapter, as shown in Figures 1 and 2. The exterior shape of the nose 67 and adapter 17 and the shape of the orifice 18 of the latter make it possible for the nose and adapter to move into and out of the positions shown by reason of the yielding nature of the bellows 60 when not inflated.

In the operation of the connector, with the various parts thereof in the positions shown, fluid pressure is admitted to the bore of pipe 62, said pressure discharging into bellows 60 through the forward end of the pipe and through ports 64 therein. This causes the bellows to elongate in an axial direction and carries the nose 67 into fluid-tight engagement with the orifice 18 of adapter 17, so that the pressure fluid that distends the bellows will flow through the stem 16 and into the expansible core in a tire to be vulcanized. Back pressure in the bellows 60 forces the entire housing structure 53 rearwardly relatively of the adapter 17 and base plate 50 so that the forward wall of the head 56 engages the rear of the adapter, thereby preventing movement of the latter under pressure of the forwardly urged nose 67. A stop pin 68 threaded through the base plate 50 enters a slot 69 in the housing 53 to guide the latter and to limit its movement relatively of the base plate. The bellows restores itself to normal length when the pressure fluid therein is released, thus withdrawing the nose 67 from engagement with the adapter 17 and enabling evacuation of the expansible core.

The invention provides a strong fluid-tight connection between fluid pressure conduits, and utilizes the pressure of said fluid both for making and maintaining the connection. The device is fully automatic in its operation, and achieves the other advantages set out in the foregoing statement of objects.

Modification may be resorted to without departing from the spirit of the invention, or the scope thereof as defined by the appended claim.

What is claimed is:

A conduit coupling comprising an adapter on the end of one conduit, a housing secured to the end of the other conduit, said housing including a recess in which said adapter is receivable, a bellows within the housing receiving pressure fluid from the conduit to which the housing is secured, a tubular delivery nose opening into the bellows and movable forwardly toward said adapter when the bellows is elongated by fluid pressure and adapted to form a fluid-tight connection with said adapter, and means enabling the housing as a whole to move rearwardly, as the delivery nose is forced into engagement with the adapter, so as to confine said adapter between said nose and the forward wall of the housing.

GEORGE P. BOSOMWORTH.